UNITED STATES PATENT OFFICE

2,479,490

SYNTHETIC RUBBERY REACTION PRODUCTS OF BUTADIENE HYDROCARBONS AND SATURATED ALIPHATIC COMPOUNDS

Henri Martin Guinot, Versailles, and Raymond Buret, Melle, France, assignors to Les Usines de Melle (Societe Anonyme), Saint-Leger-les-Melle, France, a company of France No Drawing. Application August 29, 1945, Serial No. 613,420. In France August 22, 1941

Section 1, Public Law 690, August 8, 1946
Patent expires August 22, 1961

18 Claims. (Cl. 260—82.1)

It is known that butadiene when polymerized alone leads to synthetic rubbers having very poor properties and that in order to obtain a product possessing mechanical qualities suiting it for commercial use, it is absolutely necessary to associate with butadiene a further substance capable of polymerizing together with it.

As far back as 1891, Kondakoff was first to lay down that the necessary condition for polymerization of a given compound is the presence in said compound of double or triple bonds in so called conjugated or cumulated positions with respect to one another.

The foregoing theory was subsequently confirmed many times and it may be said that every investigation or operation performed up to this day was carried out along the above lines for the manufacture of rubber-like products, except as concerns isobutylene (for producing non-vulcanizable products from isobutylene by polymerizing the same) and vinyl derivatives.

As examples of the chief compounds industrially employed for producing inter-polymers with butadiene, we may mention:

Styrolene, $C_6H_5$—CH=$CH_2$
Vinyl-naphthalene, $C_{10}H_7$—CH=$CH_2$
Acrylic esters, $CH_2$=CH—C=O
$\qquad\qquad\qquad\quad |$
$\qquad\qquad\qquad\ \ \ \text{OR}$
Acrylic acid nitrile, $CH_2$=CH—C≡N
Vinyl acetylene, $CH_2$=CH—C≡CH
Ethylenic ketones,

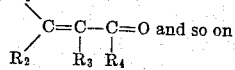

We have now found that in contradistinction with the above theory, it is possible to co-polymerize with diolefines particularly butadiene and derivatives thereof such for example as isoprene, piperylene, dimethylbutadiene and the like, compounds having a saturated molecule which are characterized by a reactive methylene group, chiefly those compounds of the general formula

R—$CH_2$—R′ wherein the $CH_2$ group is activated by groups R and R′; R, R′ are electro-negative radicals selected from the group, CN, COO—Alkyl, and $COCH_3$.

Among those compounds which are comprised by the foregoing definition and the use of which consequently lies within the scope of this invention, we may particularly mention, it being understood that the following list is not at all limitative.

Malonic esters such as diethyl ester of malonic acid $C_2H_5$—COO—$CH_2$—COO—$C_2H_5$,
Cyanacetic esters such as ethyl ester of cyanacetic acid CN—$CH_2$—COO—$C_2H_5$,
Aceto-acetic esters such as ethyl ester $CH_3$—CO—$CH_2$—COO—$C_2H_5$ Acetylacetone, $CH_3$—CO—$CH_2$—CO—$CH_3$ The proportion of compounds having a reactive methylene group may vary within fairly wide limits but in actual practice, no advantage would be found in using more than 40 per cent by weight of said compounds as reckoned upon the weight of diolefines.

More than one compound having a reactive methylene group may be co-polymerized with butadiene or other diolefinic hydrocarbon. Likewise, co-polymerisation of butadiene and one or more compounds having reactive methylene groups may be performed in the presence of another polymerisable substance of known character.

The following examples, which are not limitative, give processes and results obtained in accordance with this invention. All of them were performed in emulsion in a medium constituted by a standard solution which led to good results in known copolymerizations (particularly butadiene-acrylic acid nitrile). The composition by weight of said emulsifying solution is:

| | Parts |
|---|---|
| Water | 1000 |
| Sodium salt of sulphonated cetyl alcohol | 10 |
| $CO_3Na_2$ | 4 |
| $PO_4Na_2H$ | 4 |

The last two compounds provide a pH-value of about 8–9.

Instead of the second compound, capillary active substances such as sodium or amine ricinoleate, oleate or stearate may be employed.

Example 1

A mixture of:

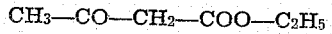

| | | |
|---|---|---|
| Butadiene | g | 200 |
| Diethyl ester of malonic acid | g | 20 |
| α,β₁-dimethyl-dioxane (10 volumes of oxygen) | ccms | 10 |
| Emulsifying solution | ccms | 500 | was stirred in an autoclave at a temperature of 50° C. After stirring for 50 hours, non-polymerized butadiene (25 g.) was distilled off; the latex obtained was then coagulated by means of acetone; it was washed, milled and dried.

A mix compounded

| | Parts by weight |
|---|---|
| Gum | 100 |
| Sulphur | 1.8 |
| Tetramethylthiuram disulphide | 0.4 |
| Mercaptobenzthiazol disulphide | 0.4 |
| Zinc oxide | 8 |
| Active black | 50 |
| Anti-oxidant | 2 | was vulcanized at a temperature of 135–140° C. for 20 minutes; the product exhibited the following characteristics:

| | | |
|---|---|---|
| Breaking stress | kg. per sq. mm | 1.600 |
| Elongation | per cent | 350 |

Example 2

The following mixture:

| | | |
|---|---|---|
| Butadiene | g | 2000 |
| Ethyl ester of cyanacetic acid | g | 200 |
| Methyltetrahydrofurane peroxide (20 volumes of oxygen) | ccms | 100 |
| Emulsifying solution | ccms | 5000 | was treated in accordance with the foregoing examples.

100 g. of non-polymerized butadiene were recovered; the latex obtained was coagulated by means of barium chloride. After milling and drying, a very nervy gum having an attractive appearance was obtained.

A mix prepared in accordance with Example 1 but including an additional 10 parts by weight of pine tar was vulcanized at 135° C. for 20 minutes; the rubber-like product exhibited the following characteristics:

| | | |
|---|---|---|
| Breaking stress | kg | 2.100 |
| Elongation | per cent | 450 |

In the foregoing examples, we have illustrated the use of compounds having a reactive methylene group by an amount averaging 10 per cent of the diolefine amount. Less amounts may likewise be employed. On the other hand, we will now show by means of further examples that higher proportions of compounds having reactive methylene groups are likewise suitable, as certain qualities of the rubber-like products are improved, particularly tensile strength and breaking stress.

Example 3

A mixture of:

| | | |
|---|---|---|
| Butadiene | g | 200 |
| Ethyl ester of cyanacetic acid | g | 30 |
| Methyltetrahydrofurane peroxide (20 volumes of active oxygen) | ccms | 10 |
| Emulsifying solution | ccms | 500 | was stirred in an autoclave for 48 hours at 40° C.

A mix was then prepared in accordance with the following formula from the gum produced as described in the foregoing examples:

| | Parts by weight |
|---|---|
| Gum | 100 |
| Zinc oxide | 5 |
| Stearic acid | 2 |
| Tetramethylthiuram monosulphide | 0.25 |
| Mercaptobenzthiazol | 0.25 |
| Carbon black | 75 |
| Sulphur | 2 |

After vulcanization for 20 minutes at a temperature of 135–140° C., the product exhibited the following characteristics:

| | | |
|---|---|---|
| Breaking stress | kg | 2.300 |
| Elongation | per cent | 450 |
| Shore hardness | | 89 |

Example 4

A mixture analogous to that specified in Example 3 but containing 50 g. of ethyl ester of cyanacetic acid, i. e. 25 per cent, was polymerized for 48 hours at a temperature of 40° C.

After preparing a mix and vulcanizing the same as described in Example 3, the rubber-like product exhibited the following characteristics:

| | | |
|---|---|---|
| Breaking stress | kg | 2.500 |
| Elongation | per cent | 500 |
| Shore hardness | | 82 |

Example 5

A mixture of:

| | | |
|---|---|---|
| Isoprene | g | 200 |
| Ethyl ester of cyanacetic acid | g | 30 |
| Methyltetrahydrofurane peroxide (20 volumes of active oxygen) | ccms | 10 |
| Emulsifying solution | ccms | 500 | was polymerized for 100 hours at 40° C.

After preparing a mix and vulcanizing the same as indicated in Example 1 but including an additional 10 parts by weight of pine tar, a rubber-like product having the following characteristics was obtained.

| | | |
|---|---|---|
| Breaking stress | kg | 1.800 |
| Elongation | per cent | 400 |
| Shore hardness | | 80 |

The expression "butadiene hydrocarbon" as used in the appended claims is intended to refer to butadiene, isoprene, piperylene and other homologues of butadiene.

What we claim is:

1. The method of producing a composition of matter, which comprises reacting a butadiene hydrocarbon while heating it with from about 10 to about 40% of a saturated organic compound of the formula R—CH$_2$—R', based on the weight of hydrocarbon taken, in an aqueous medium containing an emulsifying agent and a peroxide compound, R and R' being electro-negative radicals selected from the group consisting of CN, COO-alkyl and COCH$_3$.

2. The method of claim 1, in which the aqueous medium is initially buffered to a pH value of from 8 to 9.

3. The method of producing a composition of matter, which comprises emulsifying a butadiene hydrocarbon with from about 10 to about 40% of a saturated organic compound of the formula R—CH$_2$—R', based on the weight of hydrocarbon taken, in an aqueous medium containing an emulsifying agent and a peroxide compound, R and R' being electro-negative radicals selected from the group consisting of CN, COO-alkyl and COCH$_3$, and stirring the aqueous emulsion for at least 40 hours while heating it so as to cause said hydrocarbon and said saturated organic compound to react on one another to produce a latex.

4. The method of producing a composition of matter, which comprises admixing a butadiene hydrocarbon with from about 10 to about 40% of a saturated organic compound of the formula R—CH$_2$—R', based on the weight of hydrocarbon taken, in an alkaline aqueous medium containing an emulsifying agent and a peroxide compound, heating the admixture at a temperature not substantially above 50° C., R and R' being electro-negative radicals selected from the group consisting of CN, COO-alkyl and COCH$_3$, stirring the mixture at said temperature for at least 40 hours, so as to cause said hydrocarbon and said saturated organic compound to react on one another to produce a latex in said medium, removing any unconverted butadiene hydrocarbon, and coagulating said latex.

5. The method of claim 4, in which said latex is coagulated by means of barium chloride.

6. The method of producing a composition of matter, which comprises reacting a butadiene hydrocarbon while heating it with from about 10 to about 40% of a saturated organic compound of the formula R—CH$_2$—R', based on the weight of hydrocarbon taken, in an aqueous medium containing an emulsifying agent and a peroxide of a saturated organic heterocyclic compound having at least one nuclear oxygen atom, R and R' being electro-negative radicals selected from the group consisting of CN, COO-alkyl and COCH$_3$.

7. The method of claim 6, in which the aqueous medium is initially buffered to a pH value of from 8 to 9.

8. The method of producing a composition of matter, which comprises reacting a butadiene hydrocarbon while heating it with from about 10 to about 40% of the ethyl ester of cyanoacetic acid, based on the weight of hydrocarbon taken, in an alkaline aqueous medium containing an emulsifying agent and a peroxide compound.

9. The method of producing a composition of matter, which comprises stirring a mixture of a butadiene hydrocarbon and from about 10 to about 40% of the ethyl ester of cyanoacetic acid, based on the weight of hydrocarbon taken, in an alkaline aqueous medium containing an emulsifying agent and a peroxide compound, while heating the mixture at a temperature not substantially above 50° C., so as to cause said hydrocarbon and said ethyl ester to react on one another until a latex is produced.

10. The method of producing a composition of matter, which comprises reacting a butadiene hydrocarbon while heating it with from about 10 to about 40% of the ethyl ester of acetoacetic acid, based on the weight of hydrocarbon taken, in an alkaline aqueous medium containing an emulsifying agent and a peroxide compound.

11. The method of producing a composition of matter, which comprises stirring a mixture of a butadiene hydrocarbon, from about 10 to about 40% of the ethel ester of acetoacetic acid based on the weight of hydrocarbon taken, and an alkaline aqueous medium containing an emulsifying agent and a peroxide compound, while heating the mixture at a temperature not substantially above 50° C., so as to cause said hydrocarbon and said ethyl ester to react on one another until a latex is produced.

12. The method of producing a composition of matter, which comprises reacting a butadiene hydrocarbon while heating it with from about 10 to about 40% of acetylacetone based on the weight of hydrocarbon taken, in an alkaline aqueous medium containing an emulsifying agent and a peroxide compound.

13. The method of producing a composition of matter, which comprises stirring a mixture of a butadiene hydrocarbon, from about 10 to about 40% of acetylacetone based on the weight of hydrocarbon taken, and an alkaline aqueous medium containing an emulsifying agent and a peroxide compoud, while heating the mixture at a temperature not substantially above 50° C., so as to cause said hydrocarbon and said acetylacetone to react on one another until a latex is produced.

14. A composition of matter comprising the reaction product of a butadiene hydrocarbon and from about 10 to about 40% of a saturated organic compound of the formula R—CH$_2$—R' based on the weight of said hydrocarbon, R and R' being electro-negative radicals selected from the group consisting of CN, COO-alkyl and COCH$_3$.

15. A composition of matter comprising the reaction product of a butadiene hydrocarbon and from about 10 to about 40% of the ethyl ester of cyanoacetic acid based on the weight of said hydrocarbon.

16. A composition of matter comprising the reaction product of a butadiene hydrocarbon and from about 10 to about 40% of the ethyl ester of acetoacetic acid based on the weight of said hydrocarbon.

17. A composition of matter comprising the reaction product of a butadiene hydrocarbon and from about 10 to about 40% of acetylacetone based on the weight of said hydrocarbon.

18. A composition of matter comprising the vulcanization product of a mixture of a sulphur-containing vulcanizing agent with the coagulated reaction product of a butadiene hydrocarbon and from about 10 to about 40% of a saturated organic compound of the formula R—CH$_2$—R' based on the weight of said hydrocarbon, R and R' being electro-negative radicals selected from the group consisting of CN, COO-alkyl and COCH$_3$.

HENRI MARTIN GUINOT.
RAYMOND BURET.

REFERENCES CITED

The following references are of record in the file of this patent:

UNITED STATES PATENTS

| Number | Name | Date |
|---|---|---|
| 1,901,354 | Meisenburg | Mar. 14, 1933 |

FOREIGN PATENTS

| Number | Country | Date |
|---|---|---|
| 482,647 | Great Britain | Mar. 28, 1938 |
| 502,742 | Great Britain | Mar. 23, 1939 |
| 592,096 | Germany | Feb. 1, 1934 |